(12) United States Patent
Beck et al.

(10) Patent No.: US 7,633,538 B2
(45) Date of Patent: Dec. 15, 2009

(54) COLOR FILTER DEVICE AND METHOD FOR ELIMINATING OR REDUCING NON-UNIFORM COLOR ERROR CAUSED BY ASYMMETRIC COLOR CROSS-TALK IN IMAGE SENSOR DEVICES

(75) Inventors: Jeffery Steven Beck, Philomath, OR (US); William George Gazeley, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 542 days.

(21) Appl. No.: 11/530,574

(22) Filed: Sep. 11, 2006

(65) Prior Publication Data

US 2008/0074518 A1    Mar. 27, 2008

(51) Int. Cl.
*H04N 3/14* (2006.01)
*H04N 9/083* (2006.01)
(52) U.S. Cl. .................. 348/272; 348/273; 348/290
(58) Field of Classification Search ......... 348/272–280, 348/290–292, 315
See application file for complete search history.

(56) References Cited

U.S. PATENT DOCUMENTS

| | | | |
|---|---|---|---|
| 6,181,376 B1 * | 1/2001 | Rashkovskiy et al. | 348/273 |
| 6,573,935 B1 * | 6/2003 | Yamada | 348/272 |
| 6,900,836 B2 * | 5/2005 | Hamilton, Jr. | 348/241 |
| 7,142,233 B1 * | 11/2006 | Ogawa et al. | 348/222.1 |
| 2003/0086009 A1 * | 5/2003 | Yeh | 348/273 |
| 2003/0214594 A1 * | 11/2003 | Bezryadin | 348/280 |

* cited by examiner

*Primary Examiner*—Lin Ye
*Assistant Examiner*—Mekonnen Dagnew
(74) *Attorney, Agent, or Firm*—RatnerPrestia

(57) ABSTRACT

An image sensor device formed in an integrated circuit (IC) having a filter device in which filter elements are arranged to provide color symmetry with respect to an optical center of the imaging array of pixels. This color symmetry ensures that any color cross-talk that occurs will be symmetrical with respect to the optical center of the imaging array and will result in a color error that is radial and easily correctable using color interpolation.

9 Claims, 9 Drawing Sheets

|   | A | B | C | D | E | F |
|---|---|---|---|---|---|---|
| 1 | B | G2 | B | G2 | B | G2 |
| 2 | G1 | R | G1 | R | G1 | R |
| 3 | B | G2 | B | G2 | B | G2 |
| 4 | G1 | R | G1 | R | G1 | R |
| 5 | B | G2 | B | G2 | B | G2 |
| 6 | G1 | R | G1 | R | G1 | R |

*FIG. 5*
*(PRIOR ART)*

|   | A | B | C | D | E | F | G | H | I | J | K | L |
|---|---|---|---|---|---|---|---|---|---|---|---|---|
| 1 | G2 | B | G2 | B | G2 | B | B | G2 | B | G2 | B | G2 |
| 2 | R | G1 | R | G1 | R | G1 | G1 | R | G1 | R | G1 | R |
| 3 | G2 | B | G2 | B | G2 | B | B | G2 | B | G2 | B | G2 |
| 4 | R | G1 | R | G1 | R | G1 | G1 | R | G1 | R | G1 | R |
| 5 | G2 | B | G2 | B | G2 | B | B | G2 | B | G2 | B | G2 |
| 6 | R | G1 | R | G1 | R | G1 | G1 | R | G1 | R | G1 | R |
| 7 | R | G1 | R | G1 | R | G1 | G1 | R | G1 | R | G1 | R |
| 8 | G2 | B | G2 | B | G2 | B | B | G2 | B | G2 | B | G2 |
| 9 | R | G1 | R | G1 | R | G1 | G1 | R | G1 | R | G1 | R |
| 10 | G2 | B | G2 | B | G2 | B | B | G2 | B | G2 | B | G2 |
| 11 | R | G1 | R | G1 | R | G1 | G1 | R | G1 | R | G1 | R |
| 12 | G2 | B | G2 | B | G2 | B | B | G2 | B | G2 | B | G2 |

*FIG. 6*

COLOR FILTER DEVICE AND METHOD FOR ELIMINATING OR REDUCING NON-UNIFORM COLOR ERROR CAUSED BY ASYMMETRIC COLOR CROSS-TALK IN IMAGE SENSOR DEVICES

TECHNICAL FIELD OF THE INVENTION

The invention relates to image sensor devices. More particularly, the invention relates to a color filter device that eliminates or reduces non-uniform color error resulting from asymmetric color cross-talk between adjacent pixels in image sensor devices.

BACKGROUND OF THE INVENTION

An image sensor device is an integrated circuit (IC) having an array of pixels and circuitry for sampling the pixels and processing the pixel sample values. Pixel dimensions in image sensor devices are continually decreasing. At the same time, efforts are continually being made to increase the photodiode area of the pixels. One way to increase photodiode area is to share transistors that perform the same function amongst multiple pixels. Multiplexing devices and techniques are used in image sensor devices to allow these same-function transistors to be shared amongst multiple pixels. This pixel multiplexing makes it possible to increase full-well capacity, fill-factor, and sensitivity of the pixels, and thus to beneficially increase photodiode area. Pixel multiplexing also makes it possible to reduce the number of metal interconnect routes that are needed, which also allows photodiode area to be increased.

In image sensor devices that use pixel multiplexing, the pixels are spatially arranged in the image sensor such that an intrinsic spatial asymmetry exists between adjacent pixels. An example of a Bayer block of a known image sensor device is shown in FIG. 1. A Bayer block is a 2-by-2 group of pixels that are covered by green, red, blue, and green color filters (not shown) and together can be used to reassemble the red, green and blue components of the white light illuminating the image sensor device. The Bayer block includes a green pixel 2, and red pixel 3, a blue pixel 4, and a green pixel 5. The reset (RST) and source follower (SF) transistors 6 and 7 are shared amongst the pixels 2-5, as is the floating diffusion node 8. Each of the pixels 2, 3, 4, and 5 has a transfer transistor 9, 11, 12, and 13, respectively. Thus, the Bayer block shown in FIG. 1 has a total of six transistors.

The horizontal routes 14 of the Bayer block are formed in the lowest metal layer, the metal-1 layer. The vertical routes 15-18 are formed in the next layer above the metal-1 layer, metal layer 2. The vertical routes 15 and 16 are part of the network of conductors that provide power from the power supply, PVDD, to the pixels 2-5. The vertical route lines 17 and 18 are the even and odd bit columns, respectively. Multiplexing circuitry (not shown) is used to select (i.e., turn on) only one of the transfer transistors 9, 11, 12 and 13 at any given time to sample the selected pixel.

While the pixels 2-5 have very good symmetry with regard to mirroring about a horizontal or vertical axis, the overlaying color filters follow translational symmetry, which produces an asymmetrical optical angular response for the combined structure of the Bayer block. This asymmetrical optical angular response often results in color cross-talk between adjacent pixels, i.e., light of one color bleeding over into a pixel intended to receive light of a different color. This color cross-talk is problematic because it can lead to artifacts in the final output image produced by the image sensor device.

The manner in which color cross-talk occurs in the image sensor device shown in FIG. 1 can be in seen in FIG. 2. FIG. 2 illustrates a cross-sectional view of a portion of an image sensor device comprising two adjacent pixels 3 and 23, a color filter device 37 and a microlens structure 38. The pixel 3 on the left corresponds to the red pixel 3 shown in FIG. 1. The pixel 23 on the right of pixel 3 is an adjacent green pixel, which cannot be seen in FIG. 1. In the red pixel 3, the bottom layer 21 is the substrate, which is typically silicon, and the layer 22 above it is the photodiode layer that contains the photosensitive area 35 of the photodiode. The blocks 9 and 11 correspond to transfer transistors 9 and 11, respectively, shown in FIG. 1. Transfer transistor 11 is part of pixel 3, whereas transfer gate 9 is part of the green pixel 2 shown in FIG. 1, which is not shown in FIG. 2. The blocks 16, 17 and 18 correspond to vertical routes 16, 17 and 18, respectively, shown in FIG. 1, which are formed in the metal-2 layer. In the green pixel 23, the bottom layer 31 is the silicon substrate, and the layer 32 above it contains the photosensitive area 36 is the photodiode itself. The blocks 24 and 25 are transfer transistors. The transfer transistor 25 is part of the green pixel 23, whereas the transfer transistor 24 is part of the red pixel (not shown) to the right of green pixel 23. The blocks 26 and 27 are vertical routes formed in the metal-2 layer. Of course, layers 21 and 22 and layers 31 and 32 correspond, respectively, to the same layers.

The color filter device 37 and the microlens structure 38 are spatially arranged such that light is received by them at angles that are non-normal with respect to the plane of the color filter device 37. The spatial arrangement is intended to match the principle ray bundle angle resulting from the off-axis locations of the pixels. The principle ray bundle is represented by arrows 41. Each ray bundle is represented by a red component 41A, a green component 41B and a blue component 41C, which together form white light. The portion of the color filter device 37 shown in FIG. 3 includes a red color filter 43 and a green color filter 44. The red color filter 43 passes only the red component 41A and filters out the green and blue components 41B and 41C. The green color filter 44 passes only the green component 41B and filters out the red and blue components 41A and 41C.

The color filter device 37 and microlens structure 38 are spatially arranged as shown to ensure that the red component 41A is only incident on the photosensitive area 35 of the red pixel 3 and the green component 41B is only incident of the photosensitive area 36 of the green pixel 23. However, because of the spatial asymmetry of the adjacent pixels 3 and 23, and the angle of the light, some of the red components 41A may be incident on, or bleed into, the photosensitive area 36 of the green pixel 23, thereby resulting in color cross-talk. The optical asymmetry of adjacent pixels that results from the spatial asymmetry of the pixels is often phrased as the pixel having an asymmetrical angular response. It is also possible, but less likely because of the angle of the light, that green components 41B will be incident on the photosensitive area 35 of the red pixel 3. The situation is reversed on the opposite edge of the imaging array, where it is more likely that some green components will bleed onto the photosensitive area of the red pixel than it is that some red components will bleed onto the photosensitive area of the green pixel.

Color cross-talk between adjacent pixels can produce artifacts in the output image of the imaging device in the form of color variations across the imaging array of pixels where there should be color uniformity. For example, when imaging a target of uniform color (in particular, of uniform hue), the asymmetrical angular responses of the pixels may result in the output image having a displeasing greenish hue on one edge of the image and purple-ish hue on the other edge of the image. Furthermore, the asymmetrical angular response of pixels is even more pronounced in pixels located farther away from optical center of the imaging array, which can result in cross-talk amongst pixels closer to the optical center being unequal to cross-talk amongst pixels farther from the optical center. This unequal cross-talk typically results in more pronounced hue artifacts in the image.

FIG. 3 illustrates a top view of a color filter device 37 shown in FIG. 2. The color filter device 37 has color filter elements that are arranged in a standard Bayer block color filter pattern. The pattern is made up of many four-element groups 52-55 that are asymmetrically arranged about the optical center 56. Color cross-talk due to finite ray angles is not symmetric between the four quadrants because of the different spatial relationships of the R, G1, G2, and B filter elements of each group with respect to the optical center 56 from one quadrant to the next. For example, the G1 filter element of group 52 is the closest of the filter elements of that group to the optical center 56, whereas the G1 filter element of group 54 is the farthest of the filter elements of that group from the optical center 56. The resulting asymmetry of the color cross-talk creates an asymmetric linear-gradient color error that is non-uniform across the array. This non-uniform linear-gradient color error is not easily correctable using color correction algorithms.

Accordingly, a need exists for a way to eliminate or reduce non-uniform color error resulting from asymmetric color cross-talk between adjacent pixels in image sensor devices, especially those that employ pixel multiplexing.

SUMMARY OF THE INVENTION

The invention provides an image sensor device formed in an integrated circuit IC. The image sensor device comprises an array of pixels and a filter device. The filter device is configured to filter light such that filtered light impinges on the photodiode areas of the pixels. The filter device comprises a plurality of filter elements, each of which filters out light of wavelengths other than a respective wavelength or respective range of wavelengths such that only light of the respective wavelength or respective range of wavelengths passes through the respective filter element and is incident upon the photodiode area of one of the pixels. The filter elements are arranged to provide color symmetry with respect to an optical center of the array.

The method comprises forming a filter device having color elements that are arranged in a pattern, and disposing the filter device above an array of pixels of an image sensor device. The filter elements are arranged to provide color symmetry with respect to an optical center of the array.

These and other features and advantages of the invention will become apparent from the following description, drawings and claims.

BRIEF DESCRIPTION OF THE DRAWINGS

FIG. 5 illustrates a top view of a known imaging array that uses a color filter device in which the color filter elements are arranged in standard Bayer patterns.

FIG. 6 illustrates a top view of an imaging array that uses a color filter device in which the color filter elements are arranged in accordance with the invention to provide color symmetry with respect to the optical center of the array.

DETAILED DESCRIPTION OF THE INVENTION

In accordance with the invention, the color filter device used with an image sensor device has color filter elements that are arranged in a pattern that is symmetrical with respect to the optical center of the pixel array such any color cross-talk that occurs between adjacent pixels is also symmetrical and produces a uniform color error. Because the color error is uniform, it can be easily corrected by processing the signals output from the pixels in accordance with a suitable color correction algorithm, which is typically performed in logic in the image pipeline of the image sensor device.

Figure 4:
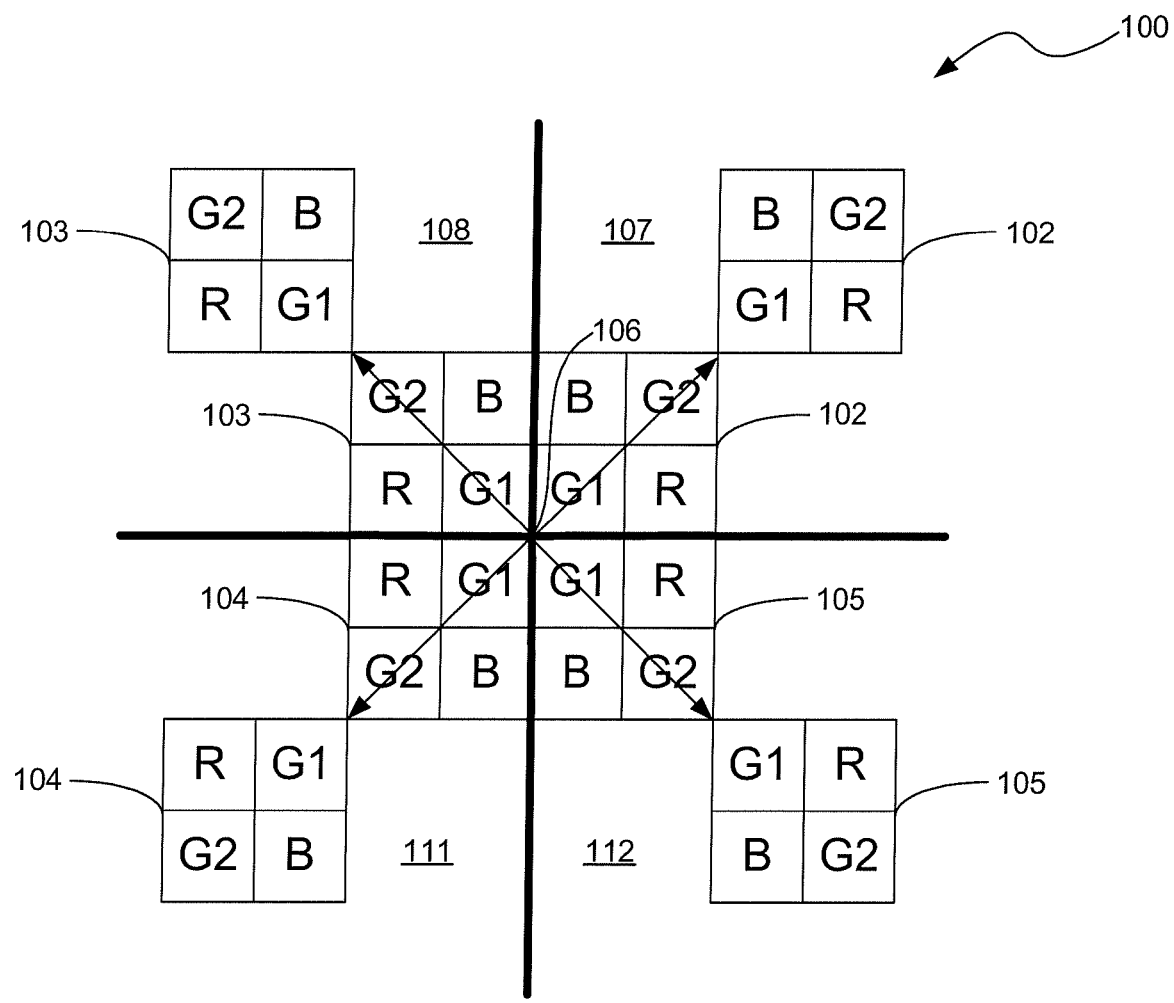
FIG. 4 illustrates a top view of the color filter device of the invention in accordance with one exemplary embodiment in which the filter elements are arranged to provide color symmetry.

FIG. 4 illustrates a top view of a portion of the filter device 100 of the invention in accordance with one exemplary embodiment. The filter device 100 has Bayer block groups of filter elements that are arranged symmetrically with respect to the optical center 106 of the pixel array (not shown). The filter device 100 has Bayer block groups of filter elements 102 formed in the northeast quadrant 107, Bayer block groups of filter elements 103 formed in the northwest quadrant 108 of the filter device 100, Bayer block groups of filter elements 104 formed in the southwest quadrant 111 of the filter device 100, and Bayer block groups of filter elements 105 formed in the southeast quadrant 112 of the filter device 100. Each quadrant is filled with Bayer block groups having elements that are arranged identically to the representative groups shown in FIG. 4. The filter device 100 typically includes thousands or millions of the Bayer block groups of filter elements extending out away from the optical center 106 of the pixel array. There is typically a one-to-one mapping of array pixels to filter elements.

It can be seen in FIG. 4 that the R, G1, G2, and B filter elements of the Bayer block groups 102-105 all have the same spatial relationship with respect to the optical center 106. For example, the G1 filter element of Bayer block group 102 has the same spatial arrangement with respect to the optical center 106 as the G1 filter elements of Bayer block groups 103-105. Likewise the R, G2 and B filter elements of Bayer block group 102 have the same spatial relationships with respect to the optical center 106 as the R, G2 and B filter elements, respectively, of Bayer block groups 103-105. By configuring the filter device 100 in this manner such that all of the R, G1, G2 and B filter elements of all of the Bayer block groups are spatially symmetric with respect to the optical origin 106, any color cross-talk that occurs will be symmetric with respect to the optical center 106. Consequently, the color error resulting from cross-talk will be uniform and radial, and therefore easily correctable using a suitable color correction algorithm.

Figure 1:
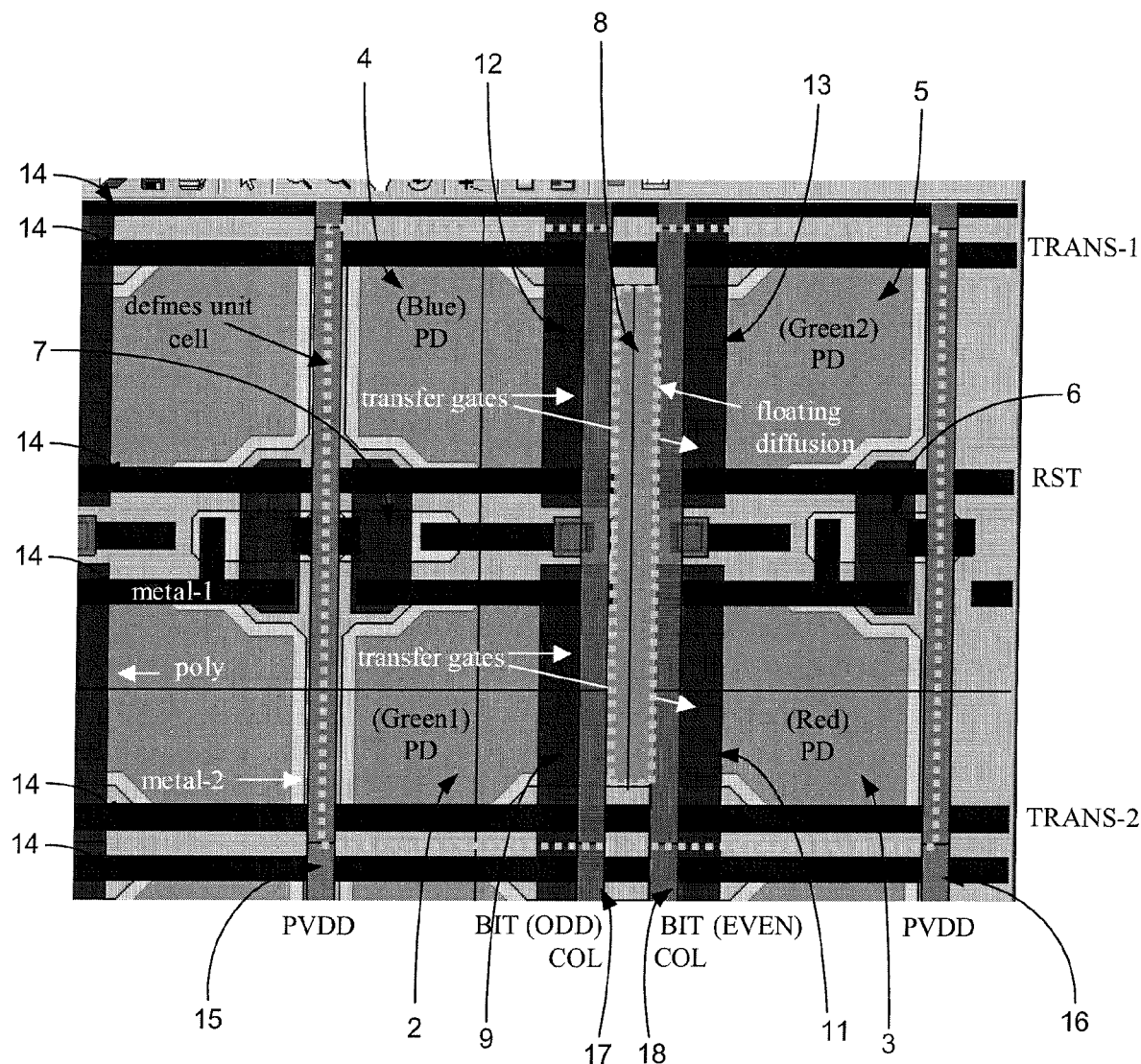
FIG. 1 illustrates a plan view of a Bayer block of a known image sensor device.
Figure 2:
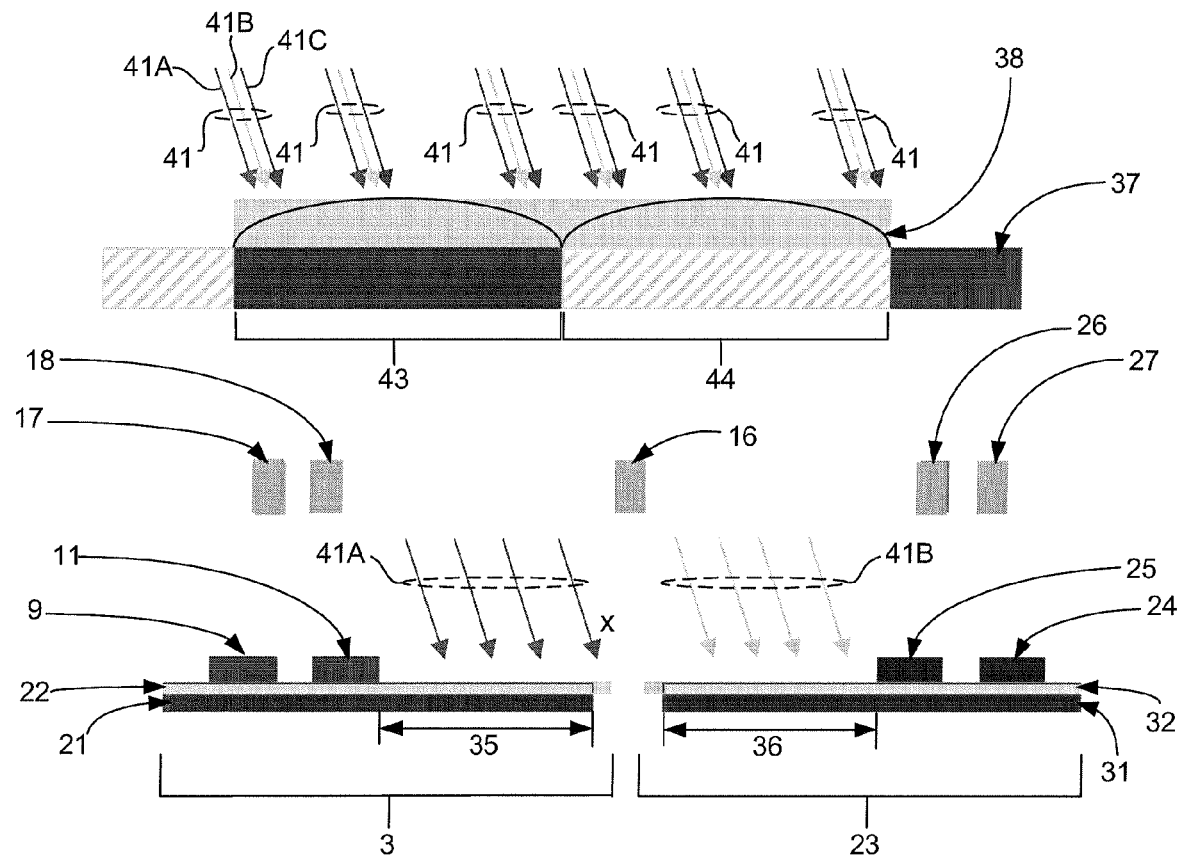
FIG. 2 illustrates a cross-sectional view of a portion of a known image sensor device comprising two adjacent pixels, a color filter device and a microlens structure.
Figure 3:
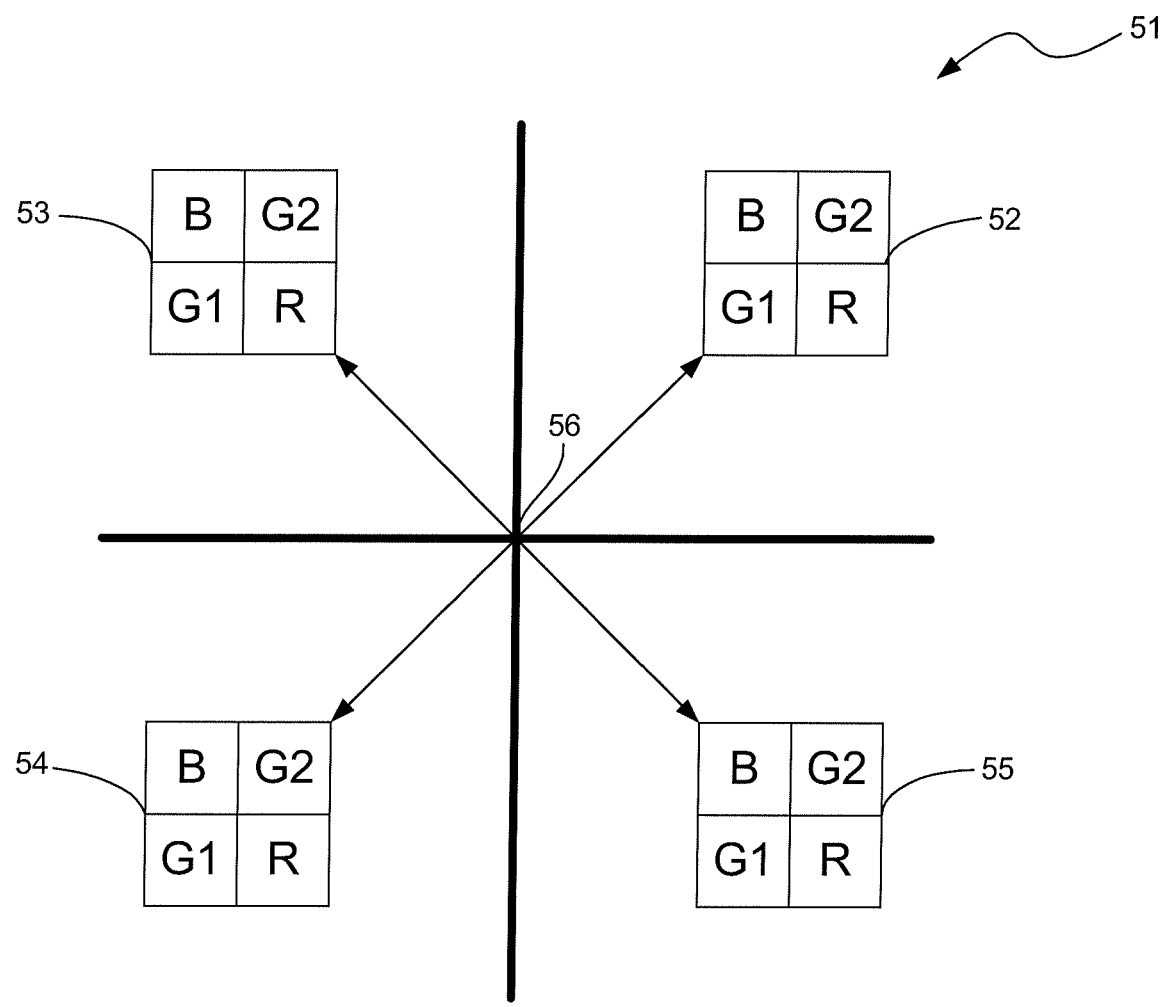
FIG. 3 illustrates a top view of the color filter device shown in FIG. 2 having a groups of filter elements arranged in a standard Bayer pattern.

As indicated above, the linear-gradient color error that can result when using the filter device 37 shown in FIG. 3 is not easily correctable. The intensity of the light that is incident on the imaging array of pixels decreases as the distance of the pixels from the optical center 56 increases. The correction algorithm that is used with image sensor devices that use the filter device 37, which is sometimes referred to as an anti-vignetting algorithm, corrects color error and compensates for reductions in light intensity at the edges of the array. Because the reduction in light intensity varies radially with respect to the optical center 56 while the color error varies linearly with respect to the optical center 56, the algorithm cannot be easily implemented and requires a significant amount of logic hardware. This hardware requirement makes it difficult or impossible to implement the color correction algorithm in logic on the image sensor IC.

Because any cross-talk that occurs when using the filter device of the invention is symmetric with respect to the optical center of the array, and results in uniform radial color error, a color correction algorithm can be relatively easily designed and implemented to correct for both the radial color error and for the radial variation in light intensity. As a result, the amount of hardware that is needed to implement the correction algorithm is reduced compared to that required to implement the known anti-vignetting algorithm. This reduction in hardware makes it possible to implement the correction algorithm in a relatively small amount of hardware in the image sensor IC. The invention, of course, is not limited to performing the correction algorithm in hardware in the image sensor IC.

The pattern of Bayer block groups of filter elements shown in FIG. 4 is designed as follows. The groups in the northeast quadrant 107, which are represented by groups 102, are first created. The northeast quadrant 107 is then folded onto the northwest quadrant 108 to create the groups represented by groups 103 in the northwest quadrant 108. The upper half of the design comprising quadrants 107 and 108 is then folded onto the lower half comprising southwest and southeast quadrants 111 and 112 to create the groups represented by groups 104 in the southwest quadrant 111 and groups 105 in the southeast quadrant 112.

Because filter elements of like color are sometimes adjacent to one another at locations where the quadrants interface with one another, the color interpolation algorithm of the invention has been modified from the standard color interpolation algorithm that is used when the known Bayer block pattern shown in FIG. 3 is used. The manner in which color interpolation is performed will now be described with reference to the standard Bayer block pattern shown in FIG. 5 and the Bayer block pattern of the invention shown in FIG. 6. The Bayer block pattern shown in FIG. 5 is the same as the pattern shown in FIG. 3 except that it has a larger number of Bayer block groups than the pattern shown in FIG. 3 in order to describe the standard interpolation algorithm. Likewise, the Bayer block pattern shown in FIG. 6 is the same as the pattern shown in FIG. 4 except that it has a larger number of Bayer block groups than the pattern shown in FIG. 4 in order to describe an exemplary embodiment of the interpolation algorithm of the invention.

The standard color interpolation algorithm generally is performed as follows. With reference to FIG. 5, the pixel at column C, row 4 (C4) is a green pixel. To recover the red signal, R(C4), at this location, the following calculation is made:

$$R(C4) = B4 * \frac{1}{2} + D4 * \frac{1}{2},$$

where B4 is the red signal at the pixel at column B, row 4, and D4 is the red signal at the pixel at column D, row 4. To recover the blue signal at this location, the following calculation is made:

$$B(C4) = C3 * \frac{1}{2} + C5 * \frac{1}{2},$$

where C3 is the blue signal at the pixel at column C, row 3, and C5 is the blue signal at the pixel at column C, row 5. The pixel at column D, row 4 (D4) is a red pixel. To recover the blue signal, B(D4), at this location, the following calculation is made:

$$B(D4) = C3 * \frac{1}{4} + E3 * \frac{1}{4} + C5 * \frac{1}{4} + E5 * \frac{1}{4},$$

where C3 is the blue signal at the pixel at column C, row 3, E3 is the blue signal at the pixel at column E, row 3, C5 is the blue signal at the pixel at column C, row 5, and E5 is the blue signal at the pixel at column E, row 5. To recover the green signal at this location, the following calculation is made:

$$G(C4) = D3 * \frac{1}{4} + C4 * \frac{1}{4} + D5 * \frac{1}{4} + E4 * \frac{1}{4},$$

where D3 is the green signal at the pixel at column D, row 3, C4 is the green signal at the pixel at column C, row 4, D5 is the green signal at the pixel at column D, row 5, and E4 is the green signal at the pixel at column E, row 4.

The color interpolation algorithm of the invention will vary depending on the pattern of color elements used in the filter device. When the pattern shown in FIG. 6 is used, the algorithm is performed as follows. For each of the quadrants, interpolation is performed in the manner described above with reference to FIG. 5 except for at the quadrant interfaces. At the interfaces, the modification to the standard algorithm compensates for the variable density of red, green and blue pixels.

With reference to FIG. 6, in columns F and G, for rows 5 and above and rows 8 and below, the blue signal in each green pixel is recovered as ½ of the signal of the pixel above and below it. In column F, for these same rows, the green signal in each blue pixel is recovered as ⅓ of the signal of the pixel above, below and to the left of it. In column G, for these same rows, the green signal in each blue pixel is recovered as ⅓ of the signal of the pixel above, below and to the right of it. In columns F and G, for even rows, the red signal is recovered in red pixels as:

$$x*E(\text{red pixel to left}) + y*H(\text{red pixel two pixels over to right}),$$

where $x+y=1$, and typically $x=\frac{3}{4}$ and $y=\frac{1}{4}$. For example, for the pixel at column F, row 4, the red signal is recovered as:

$R(F4) = \frac{3}{4} * E4 + \frac{1}{4} * H4$. In columns F and G, for odd rows, the red signal is recovered as:

$a/2*E(\text{red pixel to upper left}) + a/2E(\text{red pixel to lower left}) + b/2*H(\text{red pixel to upper right}) + b/2*H(\text{red pixel to lower right})$, where $a+b=1$, and typically $a=\frac{3}{4}$ and $b=\frac{1}{4}$. For example, for the pixel at column F, row 3, the red signal is recovered as:

$$R(F3) = \frac{3}{8}E2 + \frac{3}{8}E4 + \frac{1}{8}H2 + \frac{1}{8}H4.$$

Figure 7:
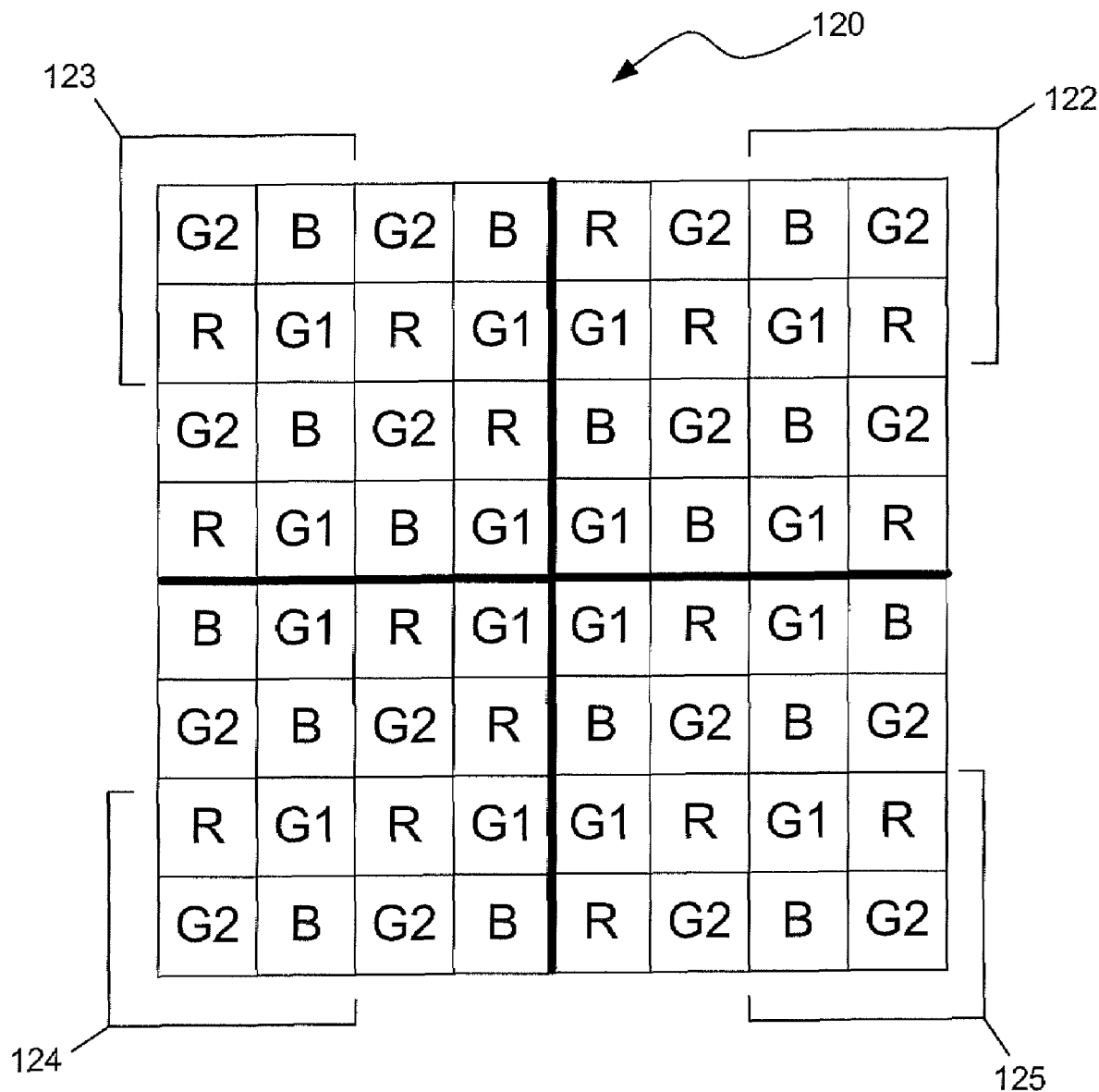
FIG. 7 illustrates a top view of the color filter device of the invention in accordance with another exemplary embodiment in which the filter elements are arranged to provide color symmetry.

FIG. 7 illustrates a top view of the filter device 120 of the invention in accordance with another exemplary embodiment. The filter element groups 122-125 are arranged identically to the groups 102-105, respectively, shown in FIG. 4. The groups along the quadrant interfaces, however, have different arrangements. This pattern provides a more even distribution of color than that provided by the pattern shown in FIG. 4. Unlike the pattern shown in FIG. 4, the pattern shown in FIG. 7 does not have adjacent red elements and adjacent blue elements at the quadrant interfaces. Like the pattern shown in FIG. 4, the pattern shown in FIG. 7 is such that the distribution of color is symmetrical with respect to the optical center of the array.

Figure 8:
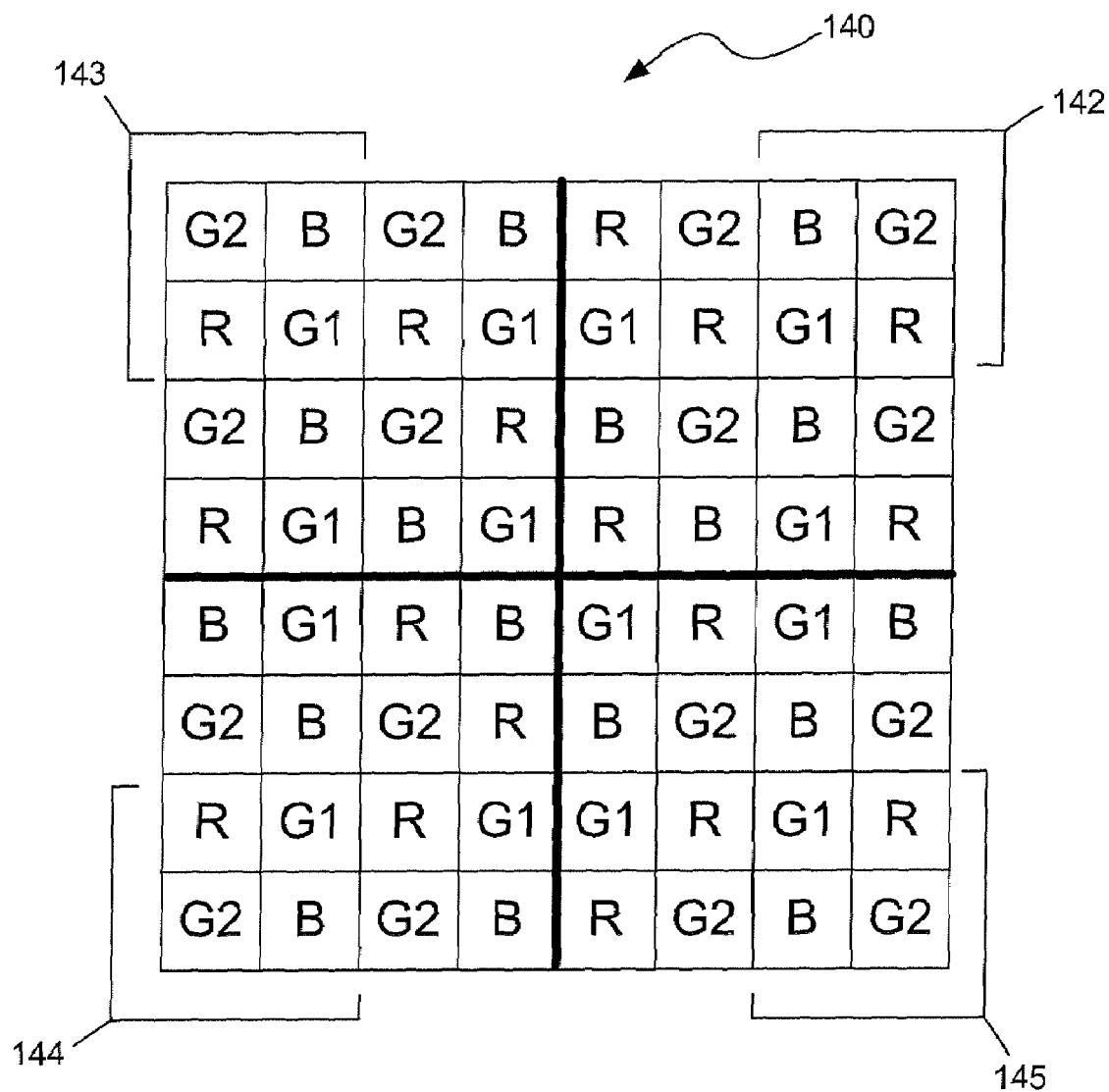
FIG. 8 illustrates a top view of the color filter device of the invention in accordance with another exemplary embodiment in which the filter elements are arranged to provide color symmetry.

FIG. 8 illustrates a top view of the filter device 140 of the invention in accordance with another exemplary embodiment. The filter element groups 142-145 are arranged identically to the groups 102-105, respectively, shown in FIG. 4. The groups along the quadrant interfaces have different arrangements. Like the pattern shown in FIG. 7, this pattern provides a more even distribution of color than that provided by the pattern shown in FIG. 4. Unlike the pattern shown in FIG. 4, the pattern shown in FIG. 8 does not have adjacent red elements and adjacent blue elements at the quadrant interfaces. Like the patterns shown in FIGS. 4 and 7, the pattern shown in FIG. 8 is such that the distribution of color is symmetrical with respect to the optical center of the array.

It should be noted that the patterns shown in FIGS. 6, 7 and 8 are only examples of patterns that provide symmetrical color distribution relative to the optical center of the array. The invention is not limited to any particular patterns. Also, while the invention has been described with reference to four-element groups, other types of group, such as two-element groups, for example, may instead be used.

Figure 9:
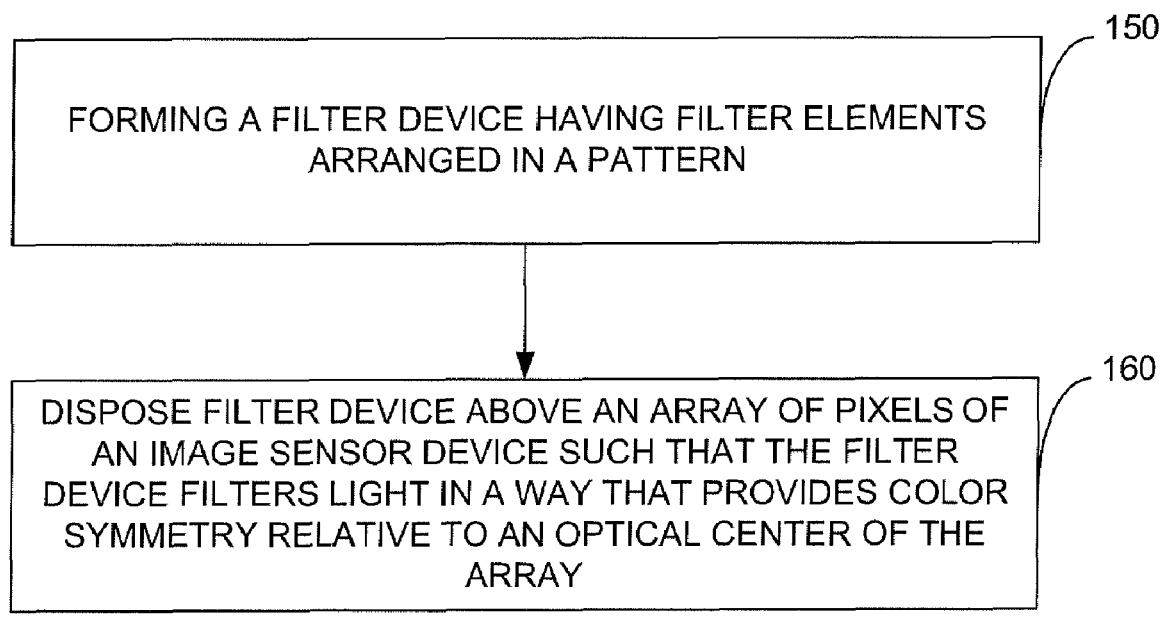
FIG. 9 illustrates a flowchart that represents the method of the invention in accordance with an exemplary embodiment for filtering light in an image sensor device to provide color symmetry with respect to an optical center of the imaging array of the image sensor device.

FIG. 9 illustrates a flowchart that represents the method of the invention in accordance with an exemplary embodiment for filtering light in an image sensor device. The method comprises forming a filter device having filter elements arranged in a pattern, as indicated by block 150, and disposing the filter device above the array of pixels of the image sensor device such that the filter device filters light in a way that provides color symmetry relative to an optical center of the array, as indicated by block 160.

It should be noted that the invention has been described with reference to particular embodiments for the purpose of demonstrating the principles and concepts of the invention. The invention, however, is not limited to these embodiments. Those skilled in the art will understand, in view of the description provided herein, the manner in which modifications can be made to the embodiments described herein, and the manner in which the principles and concepts of the invention can be extended to cover other embodiments. All such modifications and extensions are within the scope of the invention.

What is claimed is:

1. an image sensor device formed in an integrated circuit (IC), the image sensor device comprising:
   an array of pixels, each pixel having a photodiode area; and
   a filter device configured to filter light such that filtered light impinges on the photodiode areas of the pixels, the filter device comprising a plurality of filter elements, each respective filter element filtering out light of wavelengths other than a respective wavelength or respective range of wavelengths such that light of the respective wavelength or respective range of wavelengths preferentially passes through the respective filter element and is incident upon the photodiode area of one of the pixels, and wherein the filter elements are arranged to provide color symmetry with respect to an optical center of the array; and
   wherein the filter elements include red, green and blue filter elements that are spatially arranged in a pattern that is generally symmetrical relative to the optical center of the array; and
   wherein the spatial arrangement of filter elements ensures that any color cross-talk that occurs in the image sensor device is symmetrical relative to the optical center of the array and produces a color error that is radial relative to the optical center.

2. The image sensor device of claim 1, wherein the filter elements are arranged in groups, each group having a red filter element, two green filter elements and a blue filter element.

3. The image sensor device of claim 2, wherein the filter device has a northeast quadrant, a northwest quadrant, a southwest quadrant, and a southeast quadrant, and wherein the filter elements are spatially arranged such that the locations of filter elements in the northwest quadrant mirror the locations of filter elements in the northeast quadrant and such that the locations of filter elements in the southwest and southeast quadrants mirror the locations of filter elements in the northeast and northwest quadrants respectively.

4. A method for filtering light in an image sensor device formed in an integrated circuit (IC), the method comprising:
   forming a filter device having color elements that are arranged in a pattern; and
   disposing the filter device above an array of pixels of an image sensor device, the filter device comprising a plurality of filter elements, , each respective filter element filtering out light of wavelengths other than a respective wavelength or respective range of wavelengths such that light of the respective wavelength or respective range of wavelengths such that light of the respective wavelength or respective range of wavelengths preferentially passes through the respective filter element and is incident upon the photodiode area of one of the pixels, and wherein the filter elements are arranged to provide color symmetry with respect to an optical center of the array; and
   the method further including arranging the filter elements in groups, each group having a red filter element, two green filter elements and a blue filter elements; and
   the method further including arranging the filter elements to ensure that any color cross-talk that occurs in the image sensor device is symmetrical relative to the optical center of the array and produces a color error that is radial relative to the optical center.

5. The method of claim 4, further including arranging the filter elements, including red, green and blue filter elements in a pattern that is generally symmetrical relative to the optical center of array.

6. The method of claim 4, wherein the filter device has a northeast quadrant, a northwest quadrant, a southwest quadrant, and a southeast quadrant, and wherein the method further comprises arranging the filter elements such that the locations of filter elements in the northwest quadrant mirror the locations of filter elements in the northeast quadrant and such that the locations of filter elements in the southwest and southeast quadrants mirror the locations of filter elements in the northeast and northwest quadrants.

7. An image sensor device comprising: an array of pixels, each pixel comprising at least a photodiode; and an array of color filters, each color filter in the array corresponding to one respective pixel and configured to preferentially transmit a single color of light selected from the group consisting of a first color, a second color and a third color, the array being divided into a northeast quadrant, a southeast quadrant, a southwest quadrant and a northwest quadrant, wherein the color filters are arranged in groups of four filters, each group consisting of two rows of two filters each, the groups being arranged in different patterns depending on the quadrant in which the group is located; and wherein the groups of four filters are arranged to provide color symmetry with an optical center of the array; and wherein the filter elements include red, green and blue filter elements that are spatially arranged in a pattern that is generally symmetrical relative to the optical center of the array; and wherein the spatial arrangement of filter elements ensures that any color cross-talk that occurs in the image sensor device is symmetrical relative to the optical center of the array and produces a color error that is radial relative to the optical center.

8. The image sensor of claim 7, wherein:

each group of four located in the northeast quadrant is arranged in the pattern such that the first row is the third color followed by the first color and the second row is the first color followed by the second color, each group of four located in the southeast quadrant is arranged in the pattern such that the first row is the first color followed by the second color and the second row is third color followed by first color, each group of four located in the southwest quadrant is arranged in the pattern such that the first row is second color followed by first color and the second row is first color followed by third color, and each group of four located in the northwest quadrant is arranged in the pattern such that the first row is first color followed by third color and the second row is second color followed by first color.

9. The image sensor of claim 8, wherein the first color is green, the second color is red and the third color is blue.

* * * * *